Patented Nov. 22, 1927.

1,650,355

UNITED STATES PATENT OFFICE.

IVAN S. HOCKER, OF PHILADELPHIA, PENNSYLVANIA, ASSIGNOR TO THE HOCKER CORPORATION, OF PHILADELPHIA, PENNSYLVANIA, A CORPORATION OF DELAWARE.

PROCESS OF PREPARING CHOCOLATE BEVERAGE.

No Drawing.   Application filed October 2, 1924.   Serial No. 741,279.

My invention relates to a new and novel method of preparing a liquid extract of chocolate or cocoa, which will have the desirable natural flavor and color of chocolate, and will at the same time be substantially free from any fatty constituents or solid particles liable to form a sediment or turbidity in the liquid.

My invention further relates to a new and novel method of making a chocolate beverage whereby an aqueous extract of chocolate is obtained which will be substantially free from cocoa butter and all solid sedimentary material and which will have the desired preserving qualities so as to enable the same to be stored satisfactorily over extended periods of time, without the addition of any artificial preservative or chemical preservative.

With the above ends in view, my invention consists of certain novel steps in my process including the hydrolysis or the fermentation, or both, of the raw material, a subsequent separation of the fat and the separation of the resulting liquid from the solid residue.

I may start either with the cacao bean of commerce; namely, after curing and roasting, or I may use as my raw material the cocoa of commerce, in either event, I first granulate and reduce to a fine state of division, the cacao bean or the cocoa, I then prepare an aqueous mixture of this raw material to form a thin sludge. The aqueous mixture thus prepared is then heated to substantially the boiling point of water thereby gelatinizing the starchy constituents of the cocoa or cacao bean so as to render the same more susceptible to the subsequent step of hydrolysis or fermentation or both. The heated mass is then allowed to cool and is then subjected to hydrolysis. As a hydrolytic agent, I may use any one of a number of reagents such as weak acids, diastatic materials, the latter being the preferred reagent since it will not leave any undesirable taste in the finished material, which might impair the edible qualities of the product. Thus, I add to the aqueous mixture after cooling, a quantity of malt extract and allow the same to stand for a period of approximately a half hour, more or less, depending upon the percentage of starch present, which varies with the different varieties of cacao bean. This hydrolysis is preferably carried on at a temperature of about 65 degrees C. The result of the hydrolysis is the separation of the fatty and starchy constituents of the cacao bean from each other and also from the solid residue. Thus the fatty material will be dispersed throughout the mass as free fat, the starchy material converted to soluble sugar, chiefly maltose, and the fibrous and other solid residue will be similarly dispersed throughout the mass. Upon allowing this mass to stand for a sufficient length of time, a gradual coagulation of the dispersed fat takes place causing the same to gather on the top of the aqueous mixture, while the solid residue, chiefly fibrous material settles to the bottom, thus leaving in solution the sugars and essential oils which form the flavoring material, and also the coloring ingredients of the chocolate.

In one embodiment of my invention I may effect separation of the coagulated fat at this point, and separate the aqueous solution of chocolate from the solid residue by any suitable means, such as filtration and thereby obtain a non-sedimentary, fat-free aqueous chocolate liquid, containing the flavoring and coloring and ingredients of the cacao bean, as well as the sugars produced in the aqueous solution by the hydrolysis of the starchy constituents of the cacao bean.

In another embodiment of my invention I take the aqueous mixture after a hydrolysis is completed and subject the sugars in said mixture to a fermentation process thereby decomposing said sugars with an evolution of carbondioxide. The carbondioxide thus produced hastens the coagulation and separation of the cocoa butter, and at the same time produces a beverage with less sugar.

Thus by my novel process, I am enabled to produce an aqueous chocolate beverage containing all the flavoring and coloring ingredients of chocolate, which will be free from all fatty constituents of chocolate as well as solid residue or sedimentary matter, which will not be liable to spoil when stored or bottled for any length of time, and which may contain a quantity of sugar produced from the starchy constituents of the chocolate, if desired.

In carrying out my process, I may agitate the mixture slowly by any suitable means, so as to hasten the coagulation of the liberated fats.

It will now be apparent that I have devised a novel and useful process of preparing chocolate beverage which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention what I claim is new and useful and desire to secure by Letters Patent, is:—

1. The process of preparing an aqueous chocolate beverage which consists in heating an aqueous mixture of cacao bean product, to thereby gelatinize the starchy constituents of the same, and cooling the mixture to suitable temperature, hydrolyzing the starchy constituents thereof so as to convert the same to sugars, allowing the mixture to stand for a suitable length of time, separating the coagulated fats from the surface of the mixture and finally separating the supernatant liquid from the solid residue.

2. The process of preparing an aqueous chocolate beverage which consists in heating an aqueous mixture of cacao bean product, to thereby gelatinize the starchy constituents of the same, and cooling the mixture to suitable temperature, hydrolyzing the starchy constituents thereof so as to convert the same to sugars, subjecting the mixture to fermentation so as to decompose the sugars with an evolution of carbon dioxide, allowing the mixture to stand for a suitable length of time, skimming off the coagulated fats from the surface of the mixture, and finally separating the supernatant liquid from the solid residue.

3. The process of preparing an aqueous chocolate beverage, which consists in heating an aqueous mixture of a cacao bean product, to thereby gelatinize the starchy constituents of the same, cooling the mixture to a siutable temperature, hydrolyzing the starchy constituents thereof so to convert the same to sugars, agitating the mixture so as to coagulate the liberated fats, separating the coagulated fats from the mixture, and separating the liquor from the solid residue.

IVAN S. HOCKER.